UNITED STATES PATENT OFFICE.

JOKICHI TAKAMINE, OF PEORIA, ILLINOIS.

TAKA-KOJI FERMENT AND PROCESS OF PREPARING AND MAKING SAME.

SPECIFICATION forming part of Letters Patent No. 525,824, dated September 11, 1894.

Original application filed June 18, 1891, Serial No. 396,611. Divided and this application filed April 30, 1894. Serial No. 509,510. (No specimens.) Patented in England April 2, 1891, No. 5,700, and October 12, 1891, No. 17,374; in France April 13, 1891, No. 214,033, and October 19, 1891, No. 216,840; in Belgium April 14, 1891, No. 94,522, and October 24, 1891, No. 96,937; in Canada December 12, 1891, Nos. 37,961 and 37,962, and in Austria-Hungary July 2, 1892, No. 40,399, and September 28, 1892, No. 16,519.

*To all whom it may concern:*

Be it known that I, JOKICHI TAKAMINE, a subject of the Emperor of Japan, residing at Peoria, in the county of Peoria and State of Illinois, have invented a new and useful Improvement in Taka-Koji Ferments and Processes of Preparing the Same, of which the following is a specification, and for which I have secured Letters Patent in foreign countries as follows: Canada, Nos. 37,961 and 37,962, dated December 12, 1891; Belgium, No. 94,522, dated April 14, 1891, and No. 96,937, dated October 24, 1891; France, No. 214,033, dated April 13, 1891, and No. 216,840, dated October 19, 1891; Austria-Hungary, No. 40,399, dated July 2, 1892, and No. 16,519, dated September 28, 1892, and England, No. 5,700, dated April 2, 1891, and No. 17,374, dated October 12, 1891.

The object of this invention is to prepare and manufacture taka-koji ferment for use in the arts, such as alcoholic fermentation, beer brewing, yeast making, &c., in a more active, appropriate, efficient and concentrated condition, and more economic than by any process heretofore known.

In describing my invention I will apply the term "tane-koji" or "moyashi" to a mass of steamed rice, which is covered by a growth of matured or ripe microscopic mycelial fungus. I shall apply the generic term "taka-moyashi" to a mass of comminuted or broken grains of cereals, from which the greater part of starchy matter has been removed, or other substances fertilized by an artificial compound and containing fully matured or ripe microscopic mycelial fungus, such as the species *Eurotium oryzæ* (Ahlburg) of the genus *Aspergillus*, the genera *Mucor* or *Penecillium*. I shall apply the generic term pure taka-moyashi to the matured seed cells or spores of the mycelial fungi of taka-moyashi.

Heretofore in making ordinary Japanese koji of commerce it has never been possible to separate from each other the diastatic and the fermenting properties of koji, and consequently when koji was used as a diastatic agent for converting starch into sugar at a high temperature, the fermenting property thereof was destroyed and wasted. On the other hand, when koji was used as a fermenting agent, the diastatic properties thereof were of no value and were wasted. In carrying out my invention I use comminuted or broken grains of cereals, such as wheat, corn, oats, barley, &c., and particularly the comminuted or broken grains from which the greater part of starchy matter has been removed, leaving the broken or comminuted parts in the form of bran, shorts, middlings, &c. I have found wheat bran particularly well adapted for my purpose. I may use other substances which supply the ingredients necessary for the growth of the fungi, such as the solid portions of slop from alcoholic distillation, grains from beer brewing, oil cake, brans and slops from glucose and starch factories, &c.

The raw material specified above is first moistened with water until it contains from thirty to sixty per cent. of moisture. It may then be steamed and heated so as to thoroughly sterilize the mass and open the starch cells, though steaming is not absolutely necessary. Should the material be steamed the mass is allowed to cool down to a temperature below 35° centigrade. To the moistened raw material unsteamed, or the mass obtained after cooling, in case of the steaming operation, I add about one fifty-thousandth part to one ten-thousandth part by weight of the raw material employed of pure taka-moyashi, or about one one-thousandth to three one-thousandths parts by weight of the raw material employed of taka-moyashi, and thoroughly mix the same. The entire mass may then be bedded to a thickness of about six to twenty-four inches and allowed to remain in a temperature not exceeding 40° centigrade for six hours in order to retain the heat evolved by the growth of the fungus in its incipient stages. By the use of my preferred form of raw material, namely, the by-products of wheat, such as bran, shorts, &c., the bedding up step above described is unnecessary, as the growth of the fungus thereon is sufficiently vigorous and healthy without danger resulting from a cooling down of the mass. When the mass has been bedded up in order to insure an abundant growth of fungus, at the expiration of the six hours mentioned a fresh quantity of the fungous spores in the form of pure taka-moyashi may be added to the mass again, thoroughly mixed and bedded up. At the expiration of from ten to eighteen hours, in case the bedding up step is practiced, or immediately after adding the fungous seeds, in case the mass is not bedded up, the mass is spread out into thin layers, preferably from one to five inches in thickness, which is kept in the growing room in a moist atmosphere at a temperature not exceeding 45° centigrade for a period varying from twenty to eighty hours, preferably about forty, care being taken that the temperature of the mass does not rise above 45° centigrade. At the expiration of the period above mentioned the fungous growth will be sufficiently developed. The appearance of the fungous growth upon the mass indicates when it has reached its highest point of utility. The mass is then quickly cooled down to a temperature below 20° centigrade. The mass thus obtained is taka-koji. It presents a moldy appearance, the color depending largely upon the cereal forming the base, and also upon the species of fungi employed. It possesses both diastatic and fermenting properties, the latter being derived from the bloom of the fungus.

Inasmuch as taka-koji produced as above described possesses two distinct properties, namely, diastatic property, or the property of converting starch into sugar, and fermenting properties, it is exceedingly important from an economic standpoint to separate these two properties from the taka-koji, and also from each other, a separation that has never before been successfully accomplished on a commercial scale. The object of this separation is to produce without waste each property by itself, so that when a conversion is required the ferment property is not wasted, and when fermentation is desired only the ferment property of taka-koji may be employed without waste of the diastatic property. Moreover, a great saving is effected if either of the above named properties is separated from the other and used for its own purpose independently of the other.

The separation of the ferment portion may be accomplished in various ways. For instance, it may be separated from the dry taka-koji directly in the form of a fine powder by sifting the said taka-koji through a sieve, or otherwise. This powder comprises the ferment cells and is obtained from the bloom of the fungus, and possesses fermenting property in a remarkable degree. This resulting product, namely, the ferment cell portion, may be used separately and independently of the residue left after such sifting operation, which contains the diastatic property, for the purpose for which said ferment portion is adapted. If desired, the diastatic and fermenting properties of the taka-koji may be extracted together therefrom by soaking or steeping the same in water, thoroughly stirring, and then pressing the mass. By this process the diastatic property dissolves in the water, and the ferment cells, insoluble in water, become detached from the fungous growth and remain suspended in the liquid. The soaking or steeping, stirring and pressing operations may be repeated as often as may be desired in order to effect a thorough separation from the taka-koji. The liquid thus obtained contains taka-koji diastase in solution and the taka-koji ferment in suspension. The latter may be separated from the diastase solution by decantation or filtratian. To the product thus obtained I have applied the term taka-koji ferment. It is in the form of a fine, dry powder, composed of young immature spores of the mycelial fungus, and its color varies with the different fungi employed. It consists of microscopical spherical cells possessing the property of being transformed into alcoholic ferment cells when submerged in sugar solution under suitable conditions of temperature, &c.

The residue of taka-koji, after the diastatic and fermenting portions have been removed, may be used over again several times to grow a fresh supply of fungi, either as a raw material or by mixing with it fresh material. In the case of wheat bran the residue can be thus used four or five times for the propagation or production of fungi without the addition of fresh material or of any nutritious or fertilizing substances; and with the addition of only about ten per cent. of fresh wheat bran each time the original residue may be used more than ten times to grow more than ten crops of the fungi.

In carrying out my invention I use comminuted or broken grain of any of the cereals, and particularly comminuted or broken grains from which the greater part of starchy matter has been removed. I have found wheat brans, shorts or middlings particularly well adapted for this purpose, for the reason that the albuminoid contained therein and which constitutes the nutritious soil upon which the fungus is grown is more abundant and valuable for equal weight of material than other substances, thus making the soil richer and the growth of the fungus thereon more vigorous, healthy and abundant, and consequently, more valuable. Moreover, being a by-product or waste product of mills it is easily obtained in abundance in all seasons of the year, and also presents a richer soil than other material, offering ready access of air. The growth of the fungus thereof is vigorous and healthy, producing an abundance of bloom from which the taka-koji ferment is derived, as above described. These advantages will be readily appreciated when it is considered that taka-koji ferment as above described entirely supersedes the use of yeast in the alcoholic industry, without reference to the use thereof in other industries and arts. Actual practice has demonstrated that for a given amount of mash to be fermented a more complete fermentation thereof is effected by the use of taka-koji ferment than is possible by the use of yeast. A purer, more desirable product is obtained, possessing a better flavor and commanding a higher price therefor.

The present application is a division of my prior application, Serial No. 396,611, filed June 18, 1891, for "improvement in preparing and making taka-koji," and covers the subject matter divided out of said application.

I do not claim herein taka-koji or the process of making the same, nor taka-koji diastase, as they are fully set forth and covered in said application above referred to; but,

Having now fully described my invention, what I claim as new, and desire to secure by Letters Patent of the United States, is—

1. The process of making taka-koji ferment which consists in moistening a mass of comminuted or broken grains of cereals, then steaming and heating the same, then adding thereto in the proportions specified taka-moyashi, and subjecting the same to the proper temperature and manipulation until the fungus develops and then separating therefrom the ferment cell portions; substantially as described.

2. The process of making taka-koji ferment, which consists in developing upon a mass of comminuted or broken grains of cereals from which the more starchy part has been removed a growth of the specified fungus to the desired degree, then separating from the mass thus obtained the ferment cell portions of the fungus; substantially as described.

3. The process of making taka-koji ferment, which consists in developing a fungous growth upon a suitable base under proper manipulation and conditions of temperature and humidity, then steeping or soaking the mass thus obtained with water and stirring the same, whereby the ferment cell portion of the fungous growth is detached therefrom and held in suspension in the resulting liquor; and finally separating said ferment cell portion therefrom by filtration; as and for the purpose specified.

4. The process of making taka-koji ferment, which consists in developing upon comminuted or broken grains of cereals, from which the more starchy part has been removed, a growth of the specified fungus to the desired stage of growth under suitable conditions of temperature and humidity, then drying the mass, then treating the same with water, whereby the ferment portion of such growth is detached and held in suspension in the solution; and finally separating said ferment portion therefrom by filtration; as and for the purpose set forth.

5. As a composition of matter, taka-koji ferment in the form of fine dry powder, comprising young, immature spores of mycelial fungus, and consisting of microscopic spherical cells possessing the property of being transformed into alcoholic ferment cells when submerged in sugar solution under suitable conditions; as and for the purpose specified.

In witness whereof I have hereunto set my hand this 26th day of April, 1894.

JOKICHI TAKAMINE.

In presence of—
TIKUKUHI SHIMIDZU,
WM. FIELDER.